US010438105B2

(12) United States Patent
Obukhov et al.

(10) Patent No.: US 10,438,105 B2
(45) Date of Patent: Oct. 8, 2019

(54) ELECTRONIC LABEL

(71) Applicant: Western Digital Technologies, Inc., San Jose, CA (US)

(72) Inventors: Dmitry Obukhov, San Jose, CA (US); Muthukumar Karuppiah, San Ramon, CA (US); Khurram Ismail, Milpitas, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/634,968

(22) Filed: Jun. 27, 2017

(65) Prior Publication Data

US 2018/0373972 A1 Dec. 27, 2018

(51) Int. Cl.
| | |
|---|---|
| *G06K 19/06* | (2006.01) |
| *G06K 19/07* | (2006.01) |
| *G06K 19/14* | (2006.01) |
| *G06K 19/073* | (2006.01) |

(52) U.S. Cl.
CPC .. *G06K 19/07327* (2013.01); *G06K 19/06112* (2013.01); *G06K 19/0707* (2013.01); *G06K 19/0728* (2013.01); *G06K 19/14* (2013.01)

(58) Field of Classification Search
CPC ................................ G08B 13/14; H04B 10/00
USPC ............................................ 340/572.1, 572.8
See application file for complete search history.

(56) References Cited

U.S. PATENT DOCUMENTS

| | | | | |
|---|---|---|---|---|
| 7,607,788 | B2* | 10/2009 | Gilbert | .................... B60R 1/088 359/603 |
| 8,432,600 | B2* | 4/2013 | Brown | .................... B60R 1/088 359/263 |
| 8,552,866 | B2* | 10/2013 | Pokrajac | ............ G08B 21/0286 340/10.1 |
| 8,971,715 | B2 | 3/2015 | Zhang et al. | |
| 9,785,880 | B2* | 10/2017 | Kurian | ................ G06K 19/0727 |
| 2005/0134461 | A1* | 6/2005 | Gelbman | ........... G06K 7/10079 340/572.8 |

(Continued)

FOREIGN PATENT DOCUMENTS

| | | |
|---|---|---|
| CN | 103903041 A | 7/2014 |
| GB | 2380883 A | 4/2003 |

OTHER PUBLICATIONS

International Search Report and Written Opinion for PCT/US2018/023902 dated Jul. 4, 2018.

*Primary Examiner* — Carlos Garcia
(74) *Attorney, Agent, or Firm* — Chang & Hale LLP

(57) ABSTRACT

Systems and methods are disclosed for an electronic label system. An electronic label may include a reflective component configured to reflect light transmitted by a light source. The electronic label may also include a light blocking device configured. The light blocking device may prevent at least a portion of the light transmitted by the light source from reaching the reflective component when in a first configuration. The light blocking device may also allow the light transmitted by the light source to reach the reflective component when in a second configuration. The electronic label also includes a processing device configured to control operation of the light blocking device. The light blocking device further includes a power generation device configured to generate power for the light blocking device and the processing device.

22 Claims, 8 Drawing Sheets

(56) References Cited

U.S. PATENT DOCUMENTS

| | | | |
|---|---|---|---|
| 2007/0152834 A1* | 7/2007 | Mimura | G02B 5/045 |
| | | | 340/572.8 |
| 2008/0131140 A1 | 6/2008 | Shin et al. | |
| 2008/0199188 A1* | 8/2008 | Wu | G02B 26/001 |
| | | | 398/183 |
| 2011/0091216 A1* | 4/2011 | Addy | G06K 7/0004 |
| | | | 398/115 |
| 2013/0064548 A1 | 3/2013 | Fomby, Jr. et al. | |
| 2016/0117908 A1 | 4/2016 | Ongyanco et al. | |

\* cited by examiner

ELECTRONIC LABEL

BACKGROUND

Field

This disclosure relates to a label system. More particularly, the disclosure relates to systems and methods for operating and/or communicating data with an electronic label.

Description of Related Art

Radio-frequency (RF) identification systems (RFID systems) are often used to communicate data between an RFID chip/card/tag and an RFID reader. For example, an RFID card may be used to identify an employee. In another example, an RFID tag may be attached/affixed to an object (e.g., a package) to allow identification and/or tracking of the object. The RFID chip/card/tag may also be used to provide various other types of information/data to an RFID reader.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claims. Disclosed herein are example configurations and embodiments related to an electronic label system that may include an electronic label and a device for reading the electronic label.

Overview

As discussed above, RFID systems are often used to communicate data between an RFID chip/card/tag and an RFID reader. However, an RFID reader may be unable to read the data on an RFID chip/card if the RFID reader is too far away from the RFID chip/card. In addition, because RFID chips/cards use RF signals, RFID chips/cards may broadcast data omni-directionally (e.g., in multiple/all directions). Thus, the data may be received by devices that are not the intended recipients of the data. Furthermore, an RFID reader may be unable to communicate only with a specific RFID card/tag/chip when multiple RFID cards/tags/chips are in range of the RFID reader, due to the omni-directional nature of RFID systems. It may also be easier for other users (e.g., a malicious user) to intercept RFID signals and/or interfere with RFID systems due to the omni-directional nature of RFID systems.

Certain embodiments, examples, and/or implementations disclosed herein may allow an electronic label to passively communicate, convey, provide, transmit, etc., data to another device (e.g., a reader device). In one embodiment, the label systems described herein may allow data to be communicated at a longer distance when compared to RFID cards/chips. In another embodiment, the label systems described herein may allow for more secure communication of data between the electronic label and the reader device.

Electronic Label

Figure 1A:
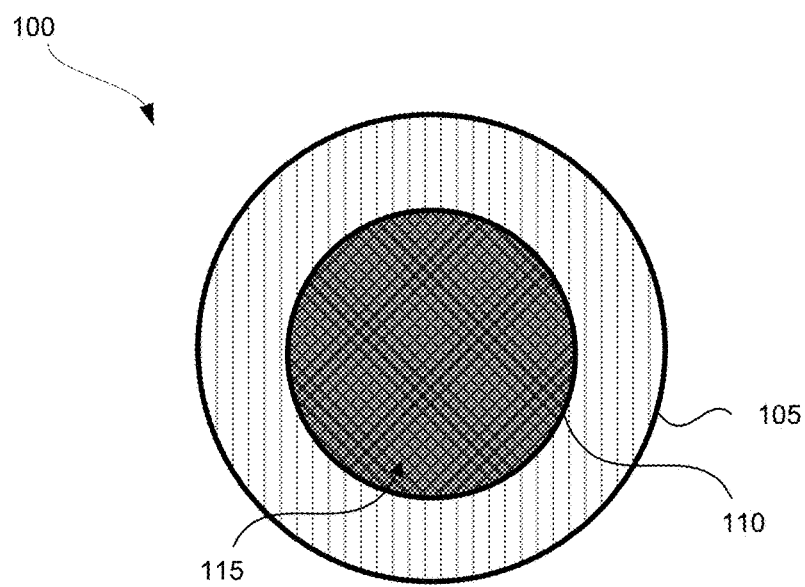
FIG. 1A is a diagram illustrating an electronic label, according to one or more embodiments of the present disclosure.

FIG. 1A is a diagram illustrating an electronic label 100, according to one or more embodiments of the present disclosure. In particular, FIG. 1A illustrates an overhead view of the electronic label 100. The electronic label 100 includes a power generation device 105, a light blocking device 110, a reflective component 115, a processing device (not visible in FIG. 1A), and a memory (not visible in FIG. 1A). In some embodiments, the electronic label 100 may optionally include a sensor device (not visible in FIG. 1A), as discussed in more detail below.

In one embodiment, the electronic label 100 may be attached to an object. For example, the back of the electronic label 100 may be adhesive and may allow the electronic label 100 to be attached/affixed to a surface of an object. The electronic label 100 may include data related to the object. For example, the electronic label 100 may include an identifier for the object (e.g., a serial number, a model number, a part number, etc.). In another example, the electronic label 100 may include data generated by a sensor of the electronic label, as discussed in more detail below.

In one embodiment, the reflective component 115 may reflect light transmitted by a first light source (e.g., a laser). For example, the first light source may transmit collimated light (e.g., red laser light, green laser light) towards the reflective component 115. The first light source may transmit other types of light such as infrared (IR) light, ultraviolet (UV) light, etc. The angle at which the collimate light is transmitted to the reflective component 115 may be referred to as the angle of incidence. The reflective component 115 may reflect at least a portion of the collimated light away from the reflective component 115, as discussed in more detail below. The angle at which the reflective component 115 reflects the collimated light (or other types of light) may be referred to as the angle of reflection. The angle of reflection may generally be equal to the angle of incidence. Examples of a reflective component 115 may include, but are not limited to a mirror, a metallic sheet/surface, etc.

In one embodiment, the light blocking device 110 may be prevent a least a portion of the light (transmitted by the first light source to the reflective component 115) from reaching the reflective component 115. For example, the light blocking device 110 may prevent (e.g., block) most or all of the light transmitted by the first light source, from reaching the reflective component 115 (e.g., the light blocking device 110 may absorb most or all of the light). Preventing most or all of the light (transmitted by the first light source) from reaching the reflective component 115 may reduce the amount of light that is reflected by the reflecting component 115.

The light blocking device 110 may be in a first configuration where the light blocking device 110 prevents the light (or a portion of the light) transmitted by the first light source, from reaching the reflective component 115. For example, as illustrated in FIG. 1A, the light blocking device 110 is in a configuration where the light blocking device 110 is darker, more opaque, less transparent, etc., when compared to FIG. 1B. The light blocking device 110 may be changed to a second configuration (where the light blocking device 110 is more transparent, less opaque, etc.), as discussed in more detail below. In one embodiment, the light blocking device 110 may be more opaque in the first configuration than in the second configuration (e.g., may block and/or absorb more light). In another embodiment, the light blocking device may be more transparent in the second configuration than in the first configuration, as discussed in more detail below. Examples of light blocking devices may include, but are not limited to, a liquid crystal display (LCD), an interferometric modulator (IMOD), etc. Blocking some/all of the light (transmitted by the first light source) and/or allowing some/all of the light to be reflected (as discussed in more detail below) may allow the electronic label 100 to convey and/or transmit data to another device (e.g., to another device, such as a reader device) that may be able to detect the reflected light) as discussed in more detail below.

In one embodiment, the processing device (not visible in FIG. 1A), may be control the operation of the light blocking device 110. For example, the configuration of light blocking device 110 may be changed between a first configuration (which blocks some or all of the light) and a second configuration (which does not block light or blocks less light), as discussed above. The processing device may change the configuration of the light blocking device 110 between the first configuration and the second configuration. In one embodiment, the processing device may access data stored in a memory (not visible in FIG. 1A) and may control the operation of the light blocking device 110 based on the data stored in the memory. For example, the data may include information that should be conveyed, communicated, provided, transmitted, etc., by the electronic label 100 (e.g., an identification number, a temperature detected by a sensor device, motion/movement detected by a sensor devices, etc.).

The processing device may be one or more general-purpose processing devices such as a microprocessor, central processing unit (CPU), a microcontroller (MCU) or the like. For example, the processing device may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device may also be one or more special-purpose processing devices such as an application specific integrated circuit (ASIC), a field programmable gate array (FPGA), a digital signal processor (DSP), network processor, or the like. The processing device may execute instructions for performing the algorithms, operations, functions, actions, and/or steps discussed herein.

In one embodiment, electronic label 100 may include one or more sensor devices (not illustrated in FIG. 1A). A sensor may be a component, module, circuit, etc., that may detect events, conditions, physical properties of an object, changes in conditions, changes in physical properties, etc. The one or more sensor devices may generate data to indicate the events, conditions, physical properties, changes in conditions, and/or changes in physical properties. For example, the one or more sensor devices may detect environmental conditions (e.g., temperature, humidity, etc.). The one or more sensors may generate data indicating the environmental conditions at different periods/points in time. In another example, the one or more sensor devices may be an accelerometer that may detect movement of the electronic label 100 and/or movement of an object where the electronic label 100 is attached (e.g., horizontal and/or vertical motion, vibrations, etc.). The one or more sensor devices may generate data indicating the movement of the object where the electronic label 100 is attached (e.g., data indicating the direction/speed of the motion).

In one embodiment, the memory may store data that may be used by the processing device to convey and/or transmit information. For example, the memory may store data indicating an identification number (e.g., a serial number) for the electronic label 100. In another example, the memory may store data indicating a date (e.g., an expiration date indicating when something expires, a maintenance date indicating when additional maintenance should be performed, etc.). In one embodiment, the data stored in the memory may be generated by one or more sensor devices of the electronic label. For example, the data may indicate temperatures detected by a thermometer (e.g., a sensor device). In another example, the data may indicate the amount and magnitude of vibrations detected by an accelerometer (e.g., a sensor device).

In one embodiment, the power generation device 105 may generate power for the light blocking device 110, the processing device, the memory, and/or the sensor. For example, the power generation device 105 may receive light (e.g., visible light, white light, etc.), from a second light source (e.g., ambient light, a controlled light source that may be toggled on and off quickly). The power generation device 105 may generate power using the light received from the second light source. For example, the power generation device 105 may be a photovoltaic device, such as a solar panel or solar cell. The photovoltaic device may convert the energy of the light (transmitted by the second light source) into power/electricity using a photovoltaic effect. The power generation device 105 may be coupled (e.g., electrically coupled) to the processing device, the memory, and/or the sensor to provide power to the processing device, the memory, and/or the sensor. In other embodiments, the power generation device 105 may be coupled to a power storage device (e.g., a battery) and may provide power to the power storage device. The power storage device may be coupled (e.g., electrically coupled) to the processing device, the memory, and/or the sensor to provide power to the processing device, the memory, and/or the sensor. One having ordinary skill in the art understands that the second light source may be any device, component, and/or object that may transmit visible light. For example, the second light source may be a lamp or may be an ambient light source (e.g., sunlight from a window, light from an overhead light, etc.). In some embodiments, the first light source may be the same as the second light source. For example, one light source may transmit light to both the power generation device 105 and may transmit light to the reflective component 115.

In one embodiment, the power generation device 105 may detect changes in the light (e.g., visible light) transmitted by the second light source (e.g., a controlled light source). For example, the power generation device 105 may detect when the second light source is not transmitting light to the power generation device 105 and/or is transmitting less light to the power generation device 105. In another example, the power generation device 105 may detect when the second light source is transmitting light to the power generation device 104 and/or is transmitting more light to the power generation device 105. The power generation device 105 may communicate (e.g., may transmit a signal, transmit data, transmit a message, etc.) with the processing device (not illustrated in FIG. 1A) to indicate the changes in the light transmitted by the second light source (e.g., to indicate when the second light source is or is not transmitting light). This may allow another device (e.g., a computing device such as a laptop computer, a tablet computer, etc.) to transmit data to the electronic label 100, as discussed in more detail below.

Figure 1B:
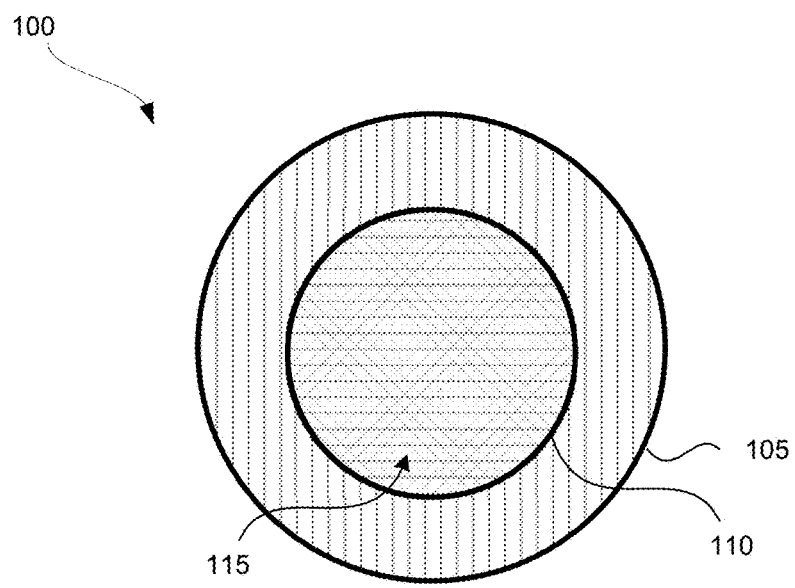
FIG. 1B is a diagram illustrating an electronic label, according to one or more embodiments of the present disclosure.

FIG. 1B is a diagram illustrating an electronic label 100, according to one or more embodiments of the present disclosure. In particular, FIG. 1B illustrates an overhead view of the electronic label 100. The electronic label 100 includes a power generation device 105, a light blocking device 110, a reflective component 115, a processing device (not visible in FIG. 1B), and a memory (not visible in FIG. 1B). In some embodiments, the electronic label 100 may optionally include a sensor device (not visible in FIG. 1B), as discussed in more detail below. In one embodiment, the electronic label 100 may be attached to an object, as discussed above. The electronic label 100 may include data related to the object. The electronic label 100 may also include data generated by a sensor of the electronic label.

In one embodiment, the reflective component 115 may reflect light (at an angle of reflection) transmitted by a first light source to the reflective component 115 (at an angle of incidence), as discussed above. The first light source may transmit other types of light such as IR light, UV light, etc. The reflective component 115 may reflect at least a portion of the collimated light away from the reflective component 115, as discussed in more detail below.

In one embodiment, the light blocking device 110 may allow light (transmitted by the first light source to the reflective component 115) to reach the reflective component 115. For example, the light blocking device 110 may allow most or all of the light transmitted by the first light source, to reach the reflective component 115 (e.g., the light blocking device 110 may absorb none or little of the light). Allowing some or all of the light (transmitted by the first light source) to reach the reflective component 115 may increase the amount of light that is reflected by the reflective component 115. As illustrated in FIG. 1B, the light blocking device 110 may be in a second configuration where the light blocking device 110 allows the light (or a portion of the light) transmitted by the first light source, to reach the reflective component 115. In one embodiment, the light blocking device 110 may be less opaque in the second configuration than in the first configuration (e.g., may allow more light to reach the reflective component 115). In another embodiment, the light blocking device may be more transparent in the second configuration than in the first configuration.

As discussed above, the light blocking device 110 may be in a first configuration where the light blocking device 110 allows the light (or most of the light) transmitted by the first light source, to reach the reflective component 115. For example, as illustrated in FIG. 1B, the light blocking device 110 is in a configuration where the light blocking device 110 is more transparent, less opaque, etc., when compared to FIG. 1A. The light blocking device 110 may be changed to a first configuration (which may reduce the amount of light that reaches the reflective component 115), as discussed above. Allowing the some/all of the light (transmitted by the first light source) to be reflected and/or blocking some/all of the light may allow the electronic label 100 to convey and/or transmit data to another device (e.g., to another device that may be able to detect the reflected light), as discussed in more detail below.

In one embodiment, the processing device (not visible in FIG. 1B), may control the operation of the light blocking device 110. The processing device may control the operation of the light blocking device by changing the configuration of the light blocking device 110 between the first configuration and the second configuration. In another embodiment, the processing device may access data stored in a memory (not visible in FIG. 1B) and may control the operation of the light blocking device 110 based the data stored in the memory, as discussed above.

In one embodiment, electronic label 100 may include one or more sensor devices (not illustrated in FIG. 1B). The one or more sensor devices may generate data to indicate the events, conditions, physical properties, changes in conditions, and/or changes in physical properties, as discussed above. In some embodiments, the memory may store data that may be used by the processing device to convey and/or transmit information, as discussed above. In other embodiments, the data stored in the memory may be generated by one or more sensor devices of the electronic label 100, as discussed above.

In one embodiment, the power generation device 105 may generate power for the light blocking device 110, the processing device, the memory, and/or the sensor, as discussed above. The power generation device 105 may be a photovoltaic device, such as a solar panel or solar cell, as discussed above. In other embodiments, the power generation device 105 may be coupled to a power storage device (e.g., a battery) and may the power storage device may provide power to the processing device, the memory, and/or the sensor, as discussed above.

In one embodiment, the power generation device 105 may detect changes in the light transmitted by the second light source. The power generation device 105 may communicate with the processing device (not illustrated in FIG. 1B) to indicate that changes in the light transmitted by the second light source (e.g., to indicate when the second light source is or is not transmitting light). This may allow another device to transmit data to the electronic label 100, as discussed in more detail below.

Figure 2A:
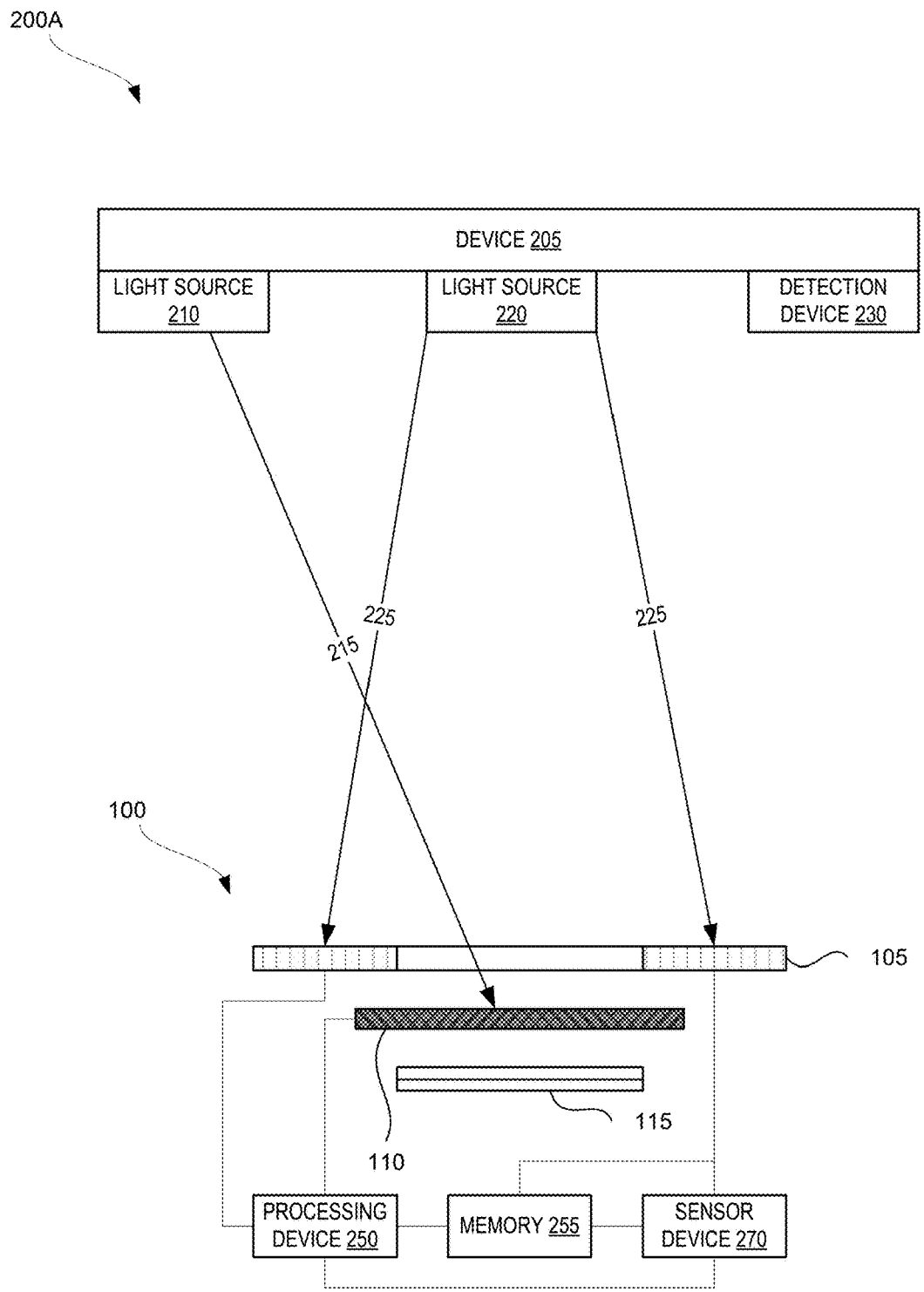
FIG. 2A is a diagram illustrating a label system, according to one or more embodiments of the present disclosure.

FIG. 2A is a diagram illustrating a label system, according to one or more embodiments of the present disclosure. The label system 200A includes an electronic label 100 and a device 205. The electronic label 100 includes a power generation device 105, a light blocking device 110, a reflective component 115, a processing device 250, a memory 260, and a sensor device 270, as discussed above. In some embodiments, the electronic label 100 may include multiple sensor devices or the sensor device 270 may be optional. FIG. 2A illustrates an expanded (e.g., exploded) profile (e.g., side) view of the electronic label 100.

The device 205 includes a light source 220 (e.g., a first light source), a light source 210 (e.g., a second light source) and a detection device 230. The light source 220 may be a device that may transmit visible light to the electronic label 100 (e.g., ambient light, a flashlight, a lamp, etc.). The light source 210 may be a device (e.g., a laser, IR laser, a UV laser, etc.) that may transmit light (e.g., IR light, UV light, laser light) to the reflective component 115 so that the reflections of the light may be detected by the detection device 230. The detection device 230 may be a sensor that is capable of detecting the light transmitted by the light source 210 and reflecting by the reflective component 115. For example, the detection device 230 may be an IR sensor, a UV sensor, etc. The device 205 may also include a processing device (not shown in FIG. 4A). The processing device may control the operation of the light source 210 and/or the light source 220 (e.g., may turn the light source 210 and/or the light source 220 on/off). The processing device may also determine the data transmitted by the electronic label based on the light reflected by the reflective component 115. The device 205 may be referred to as a reader device.

In one embodiment, the light source 220 (e.g., a flashlight) may transmit light 225 to the electronic label 100. Light 225 may be ambient light (e.g., ambient sunlight, ambient light from a lamp in a room, etc.) and thus may not be transmitted by device 205 and/or light source 220. In particular, the light source 220 may transmit light 225 to the power generation device 105. The power generation device 105 may generate power for the processing device 250, the memory 255, the sensor device 270 and/or the light blocking device 110, using the light 225, as discussed above.

As illustrated in FIG. 2A, the light source 210 may transmit light 215 (e.g., IR light, UV light, laser light, etc.) towards the reflective component 115. The light blocking device 110 may be in a first configuration where the light blocking device 110 prevents the light 215 (or a portion of the light 215) transmitted by a light source 210, from reaching the reflective component 115. For example, the light blocking device 110 is in a configuration where the light blocking device 110 is darker, more opaque, less transparent, etc., when compared to FIG. 2B. The darkness/opaqueness of the light blocking device 110 may prevent the light 215 from reaching the reflective component 115. This may prevent the reflective component 115 from reflecting the light 215 towards the detection device 230 because the light 215 does not reach the reflective component 115.

Blocking the some/all of the light (transmitted by the first light source) and/or allowing some/all of the light to be reflected (as discussed in more detail below) may allow the electronic label 100 to convey and/or transmit data to another device (e.g., to another device that may be able to detect the reflected light) as discussed in more detail below. For example, selectively preventing and/or allowing the light 215 to be reflected towards the detection device 230 may represent binary data. If the light 215 (transmitted by the light source 210) is blocked (by the light blocking device 110) from being reflected to/toward the detection device 230 for a period of time (e.g., for ¼ of a second, for a second, etc.), the device 205 may determine that a "0" is being transmitted by the electronic label 100.

Figure 2B:
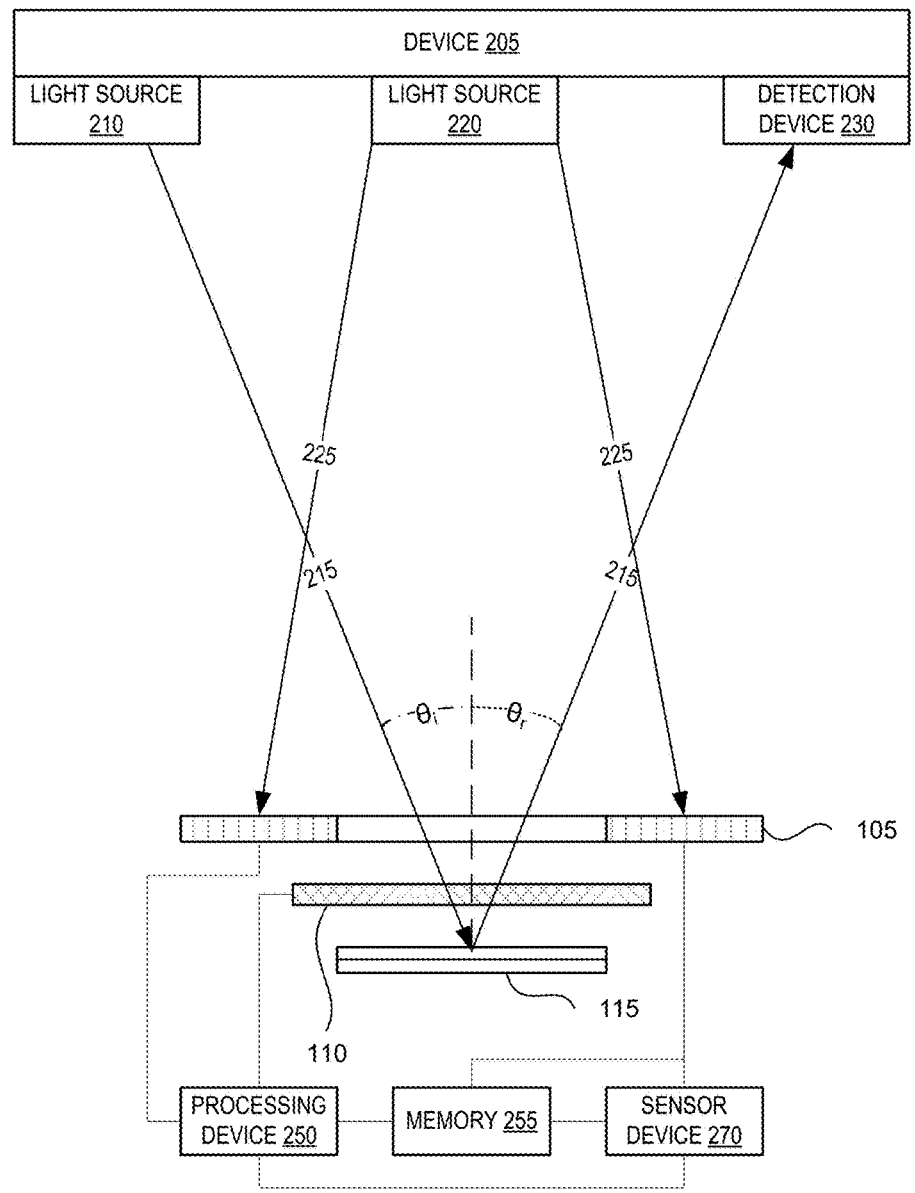
FIG. 2B is a diagram illustrating a label system, according to one or more embodiments of the present disclosure.

FIG. 2B is a diagram illustrating a label system 200B, according to one or more embodiments of the present disclosure. The label system 200B includes an electronic label 100 and a device 205, as discussed above. The device 205 includes a light source 220 (e.g., a first light source), a light source 210 (e.g., a second light source) and a detection device 230, as discussed above. In some embodiment, light source 210 may be omitted if ambient light is used to power the electronic label 100. The electronic label 100 includes a power generation device 105, a light blocking device 110, a reflective component 115, a processing device 250, a memory 260, and a sensor device 270, as discussed above. In some embodiments, the electronic label 100 may include multiple sensor devices or the sensor device 270 may be optional. FIG. 2B illustrates an expanded (e.g., exploded) profile (e.g., side) view of the electronic label 100.

In one embodiment, the light source 220 (e.g., a flashlight) may transmit light 225 to the electronic label 100 and/or the power generation device 105. The power generation device 105 may generate power for the processing device 250, the memory 255, the sensor device 270 and/or the light blocking device 110, using the light 225, as discussed above.

As illustrated in FIG. 2B, the light source 210 may transmit light 215 (e.g., IR light, UV light, laser light, etc.) towards the reflective component 115. The light blocking device 110 may be in a second configuration where the light blocking device 110 allows the light 215 (or most of the light 215) transmitted by a light source 210, to reach the reflective component 115. For example, the light blocking device 110 is in a configuration where the light blocking device 110 is more transparent, less opaque, etc., when compared to FIG. 2A. The increased transparency of the light blocking device 110 may allow the light 215 to reach the reflective component 115. As illustrated in FIG. 2B, the light 215 may contact, hit, etc., the reflective component 115 at an angle of incidence $\theta_i$. Also as illustrated in FIG. 2B, the light 215 may reflect off of the reflective component 115 at an angle of reflection $\theta_r$. The angle of incidence $\theta_i$ is generally equal to the angle of reflection $\theta_r$. In some embodiments, the positions of the light source 210 and the detection device 230 may be based on the angle of reflection $\theta_r$ and/or the angle of reflection $\theta_r$. For example, if the angle of reflection $\theta_r$ and/or the angle of reflection $\theta_r$ are smaller, than the light source 210 and the detection device 230 may be closer to each other, and vice versa.

Blocking the some/all of the light (transmitted by the first light source) and/or allowing some/all of the light to be reflected (as discussed in more detail below) may allow the electronic label 100 to convey and/or transmit data to another device (e.g., to another device that may be able to detect the reflected light) as discussed in more detail below. For example, preventing and/or allowing the light 215 to be reflected towards the detection device 230 may represent binary data. If the light 215 (transmitted by the light source 210) is reflected to/toward the detection device 230 for a period of time (e.g., for ¼ of a second, for a second, etc.), the device 205 may determine that a "1" is being transmitted.

As discussed above, changing the configuration of the light blocking device 110 between the first configuration (which prevents light from being reflecting by the reflective component 115) and the second configuration (which allows light to be reflected by the reflective component 115) allows the electronic label 100 to selective reflect the light 215 to the detection device 230. The device 205 may determine binary data based on the light 215 that is selectively reflected by the electronic label. To use a simplified teaching example, the electronic label 100 may selectively reflect the light 215 in the following pattern: 1) allow light 215 to be reflected for one second; 2) prevent light 215 from being reflected for two seconds; 3) allow light 215 to be reflected for three seconds; 4) prevent light 215 from being reflected for one second; and 5) allow light 215 to be reflected for one second. If the detection device 230 does not detect light 215 for one second, the device 205 may determine that a "0" bit is being transmitted by the electronic label 100. If the detection device 230 does detect light 215 for one second, the device 205 may determine that a "1" bit is being transmitted by the electronic label 100. The device 205 (e.g., a processing device of the device 205, such as a CPU, a processor, a MCU, etc.) may determine that pattern of reflected light corresponds to the binary string/data "10011101." In certain embodiments, the bit rate may be higher than the one bit per second in the various examples provided above.

In some embodiments, the label systems described herein (e.g., label system 200A, 200B, 400A, and/or 400B) may allow the electronic label 100 to passively communicate, convey, provide, transmit, etc., data to the device 205. For example, the device 205 may use the reflections of the light generated by the device 205 itself (e.g., the light source 220) to receive data from the electronic label 100, rather than using light generated by the electronic label 100. In other embodiments, the label systems described herein may allow data to be communicated at a longer distance when compared to RFID cards/chips. For example, an RFID reader may be unable to read the data on an RFID chip/card if the RFID reader is too far away from the RFID chip/card (e.g., is more than a foot away). However, the device 205 may be able to communicate data with the electronic label 100 at longer distances (e.g., tens of feet, hundreds of feet, etc.) because the light (e.g., laser light) may be detectable over the longer distances.

In some embodiments, the label systems described herein may allow for more secure communication of data between the electronic label 100 and the device 205. For example, because RFID chips/cards use RF signals, RFID chips/cards may broadcast data omni-directionally (e.g., in multiple/all directions). Thus, the data may be received by devices that are not the intended recipients of the data. For example, a malicious user may have an RFID reader and may be able to read the data on an RFID chip/card by simply placing the RFID reader close to the RFID chip/card. However, the electronic label 100 may not convey, provide, transmit, etc., data omni-directionally. The device 205 may not be able to receive data from the electronic label 100 if the device 205 does not have a direct line of sight to the reflective component 115. This may allow the electronic label 100 to communicate data with select reader devices, and vice versa.

In addition, the label systems described herein may allow for more secure communication of data between the electronic label 100 and the device 205 by allowing the device 205 to communicate data with a specific electronic label. For example, if an RFID reader is in the vicinity of multiple RFID chips/cards, the RFID reader may receive data from multiple RFID chips/cards even though the user may wish to receive data from a single RFID chip/card. Because the device 205 may be unable to communicate data with the electronic label 100 without a direct line of sight to the reflective component 115, the label system may allow the device 205 to communicate with specific labels.

Furthermore, the label systems described herein may allow for more secure communication of data between the electronic label 100 and the device 205 by using light (e.g., reflected light) to communicate the data. Light, such as laser beams, may be harder to intercept and/or interfere with when compared to other means of communicating data, such as RF signals.

Figure 3:
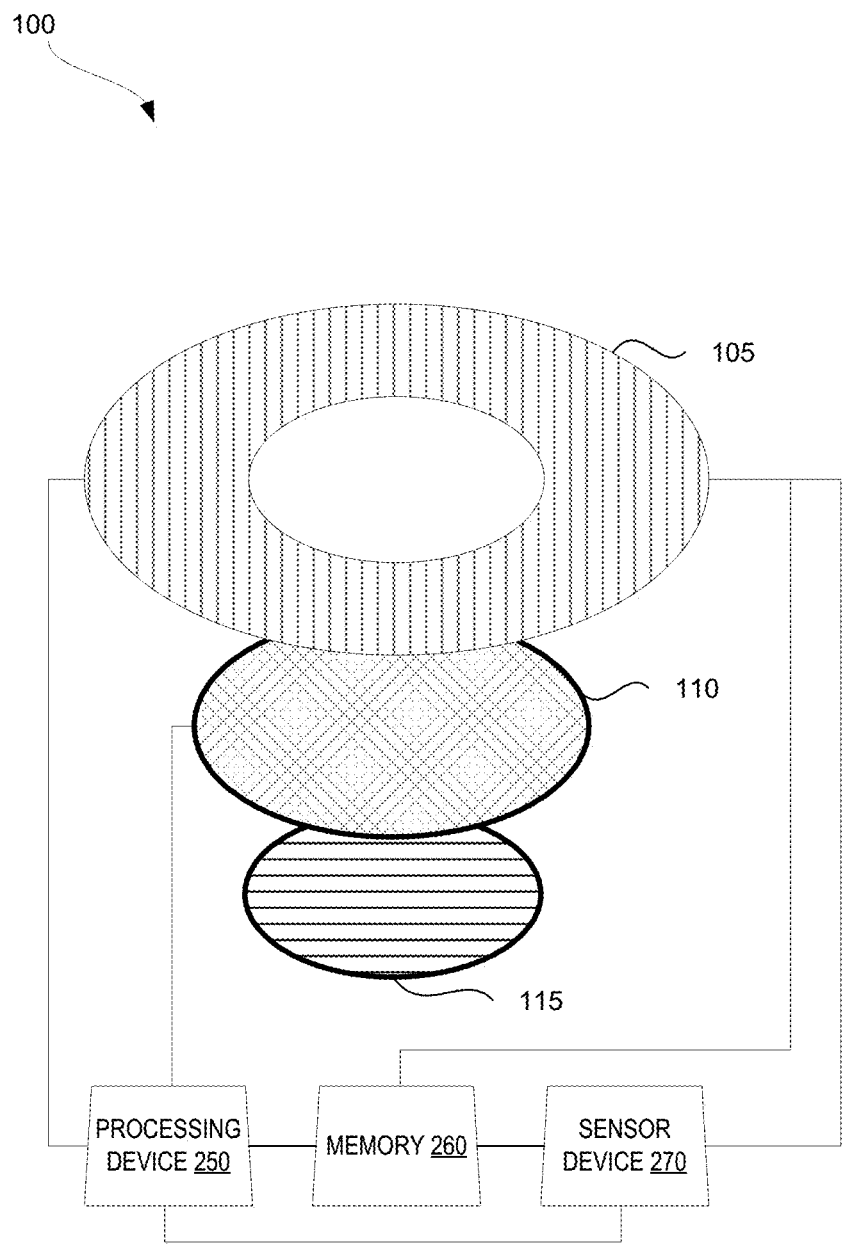
FIG. 3 is a diagram illustrating an electronic label, according to one or more embodiments of the present disclosure.

FIG. 3 is a diagram illustrating an electronic label 100, according to one or more embodiments of the present disclosure. In particular, FIG. 2 illustrates an expanded (e.g., exploded) top-down perspective view of the electronic label 100. The electronic label 100 includes a power generation device 105, a light blocking device 110, a reflective component 115, a processing device 250, and a memory 260, as discussed above. In some embodiments, the electronic label 100 may optionally include a sensor device 270 (or may include multiple sensor devices).

As illustrated in FIG. 3, the power generation device 105 is positioned over/above the light blocking device 110. The power generation device 105 has a ring shape (e.g., a donut shape) with an opening/aperture in the middle of the power generation device 105. The opening/aperture in the middle of the power generation device 105 allows light (e.g., IR light, UV light, laser light, etc.) to be transmitted through the power generation device 105 to the light blocking device 110 and/or the reflective component 115. The light blocking device 110 is positioned over/above the reflective component 115 and under/below the power generation device 105 (e.g., is positioned between the power generation device 105 and the reflective component 115). The light blocking device 110 is positioned such that the light blocking device 110 is visible through the opening/aperture in the middle of the power generation device 105. The reflective component 115 is positioned under/below the light blocking device 110 (which is positioned under/below the power generation device 105). The reflective component is also positioned such that reflective component 115 is visible through the opening/aperture in the middle of the power generation device 105 (when the light blocking device 110 is in the second configuration). The processing device 250, the memory 255, and the sensor device 270 is positioned below the power generation device 105, the light blocking device 110, and the reflective component 115.

The opening/aperture of the power generation device 105 allows the light blocking device 119 and the reflective component 115 to be positioned under the power generation device 105 while still allowing light to be transmitted to the light blocking device 119 and/or the reflective component 115 (e.g., while allowing a line of sight to the light blocking device 119 and/or the reflective component 115). Stacking the components over each other (as illustrated in FIG. 3) may allow the electronic label 100 to be smaller and/or more compact.

One having ordinary skill in the art understands that the power generating device 105, the light blocking device 110, the reflective component 115, the processing device 250, the memory 255, and/or the sensor device 270 may be arranged differently in other embodiments. For example, the power generation device 105 may be located to the left/right of the light blocking device 110 and the reflective component 115 (e.g., the power generation device 105 may be next to the light blocking device 110 and/or the reflective component). One having ordinary skill in the art also understands that various shapes and/or sizes may be used for the power generating device 105, the light blocking device 110, the reflective component 115, the processing device 250, the memory 255, and/or the sensor device 270. For example, the power generation device 105 may be square or rectangular.

In other embodiments, the electronic label 100 may be used in conjunction with other technologies and/or techniques for communicating/conveying/providing data to a data reader. For example, the electronic label 100 may be used in conjunction with an RFID card/tag. The RFID card/tag may provide data that is complementary (e.g., in addition to) the data in the electronic label 100. For example, the electronic label 100 may include data indicating temperatures detected over a period of time and the RFID card/rag may include a serial number for an object. In another example, the electronic label may be used in conjunction with a bar code label, such as a quick response (QR) code. The electronic label 100 may include maintenance data for a piece of machinery (e.g., an object) and the QR code may include a universal resource locator (URL) for instructions on how to maintain the piece of machinery.

Figure 4A:
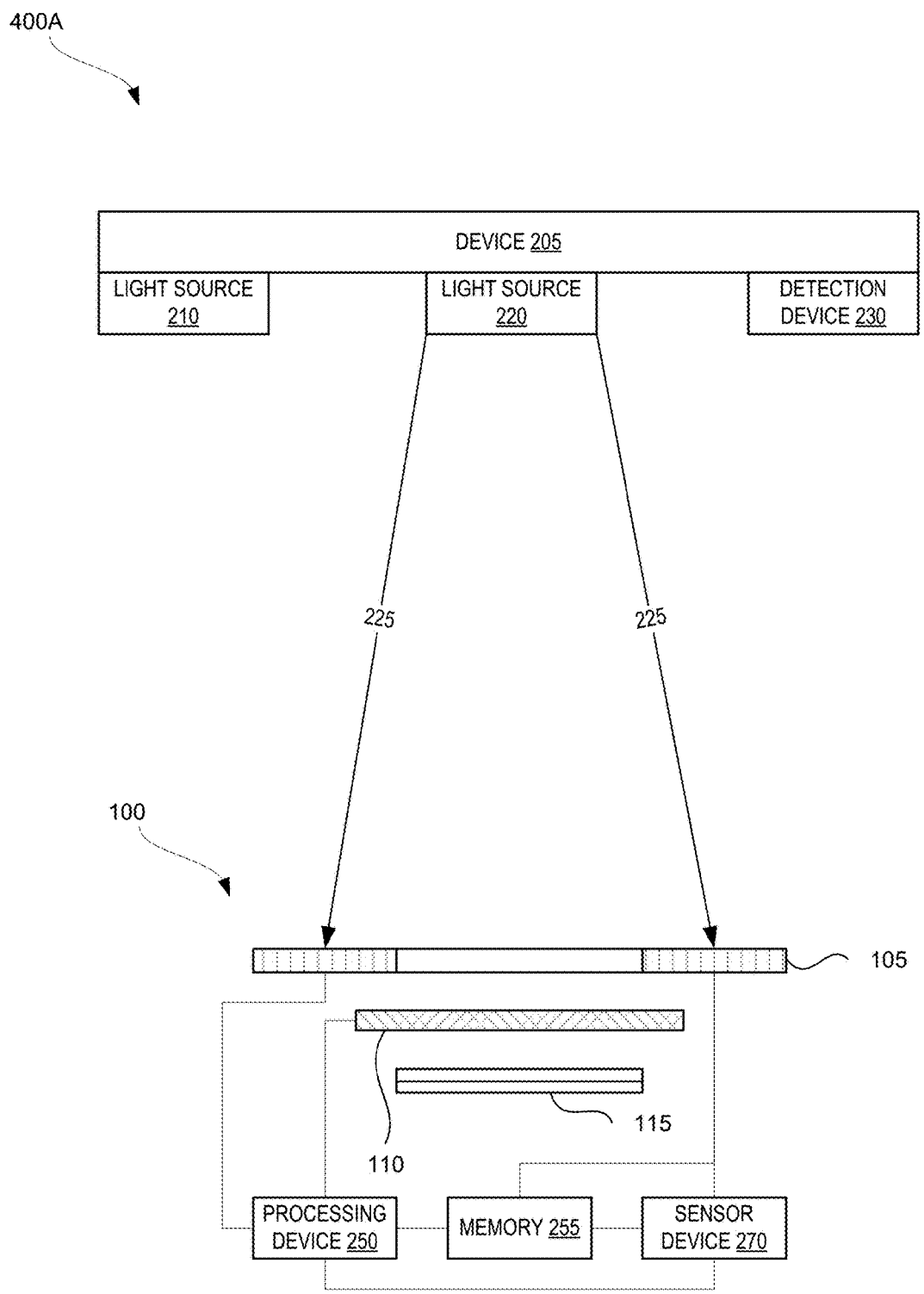
FIG. 4A is a diagram illustrating a label system, according to one or more embodiments of the present disclosure.

FIG. 4A is a diagram illustrating label system 400A, according to one or more embodiments of the present disclosure. The label system 400A includes an electronic label 100 and a device 205, as discussed above. The device 205 includes a light source 220 (e.g., a first light source), a light source 210 (e.g., a second light source) and a detection device 230, as discussed above. The electronic label 100 includes a power generation device 105, a light blocking device 110, a reflective component 115, a processing device 250, a memory 260, and a sensor device 270, as discussed above. In some embodiments, the electronic label 100 may include multiple sensor devices or the sensor device 270 may be optional.

Figure 4B:
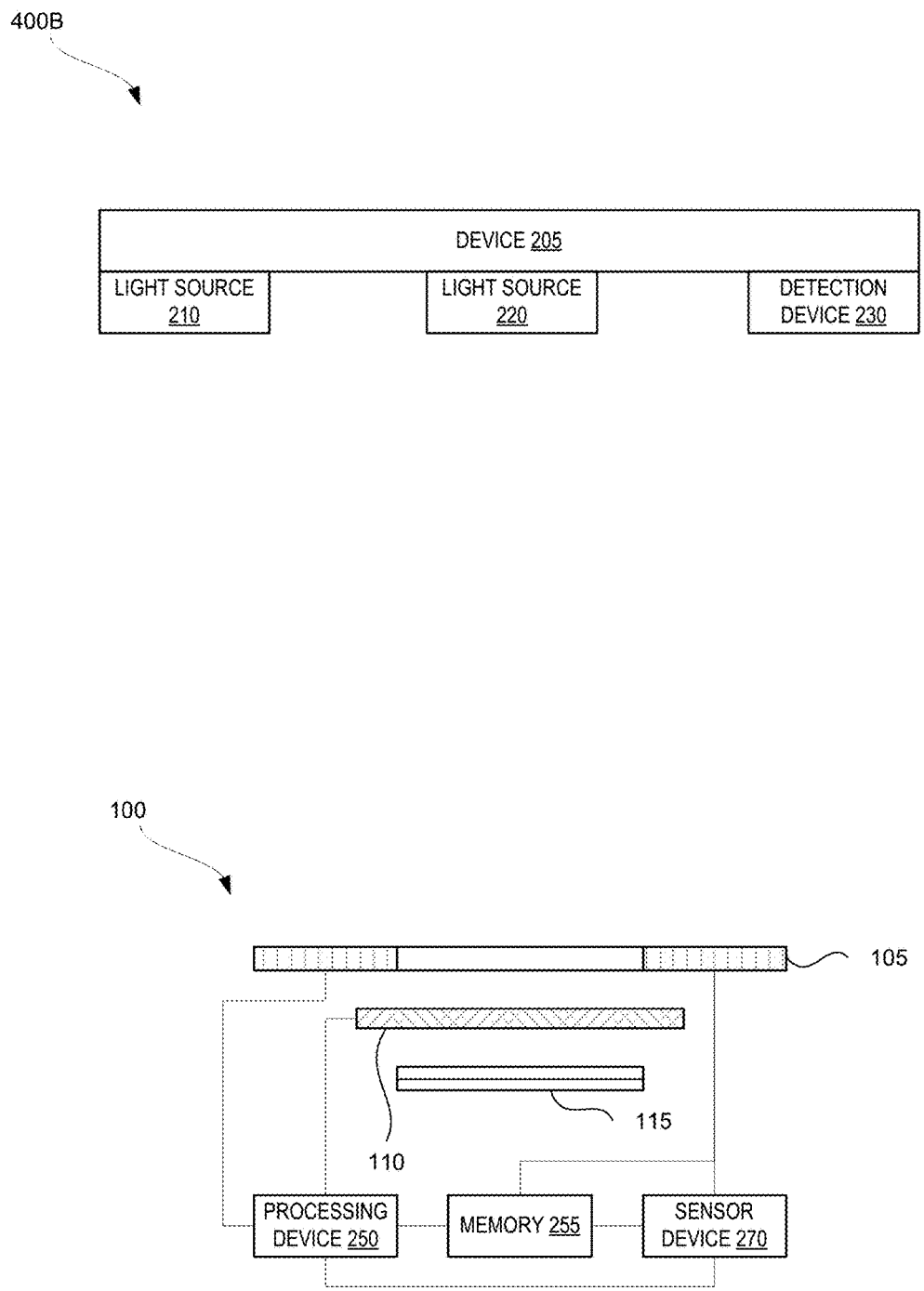
FIG. 4B is a diagram illustrating a label system, according to one or more embodiments of the present disclosure.

As discussed above, the power generation device 105 may detect changes in the light (e.g., visible light) transmitted by the second light source (e.g., ambient light). For example, the power generation device 105 may detect that the light source 220 (e.g., a controlled light source) is transmitting light 225 to the power generation device 104 (as illustrated in FIG. 4B). The power generation device 105 may indicate to the processing device 250 (e.g., transmit a signal, message, etc.) that the light source 220 is transmitting light to the power generation device 105. By turning the light source 220 on/off in a pattern (e.g., blinking the light 225 in a pattern) the device 205 may be able to transmit data (e.g., binary data) to the electronic label 100, as discussed above. For example the computing device 205 may transmit the bit "1" to the electronic label 100 by causing the light source 220 to transmit light 225 the electronic label 100 for a period of time (e.g., half a second, a second, etc.). In some embodiments, the light source 210 and the light source 220 may be combined into a single light source. For example, the single light source may transmit light to both the power generation device 105 and may transmit light to the reflective component 115.

FIG. 4B is a diagram illustrating a label system 400B, according to one or more embodiments of the present disclosure. The label system 400B includes an electronic label 100 and a device 205, as discussed above. The device 205 includes a light source 220 (e.g., a first light source), a light source 210 (e.g., a second light source) and a detection device 230, as discussed above. The electronic label 100 includes a power generation device 105, a light blocking device 110, a reflective component 115, a processing device 250, a memory 260, and a sensor device 270, as discussed above. In some embodiments, the electronic label 100 may include multiple sensor devices or the sensor device 270 may be optional.

As discussed above, the power generation device 105 may detect changes in the light (e.g., visible light) transmitted by the second light source (e.g., a flashlight). For example, the power generation device 105 may detect that the light source 220 (e.g., a flashlight) is not transmitting light 225 to the power generation device 150 (as illustrated in FIG. 4B). The power generation device 105 may indicate to the processing device 250 (e.g., transmit a signal, message, etc.) that the light source 220 is not transmitting light 225 to the power generation device 105. By turning the light source 220 on/off in a pattern (e.g., blinking the light 225 in a pattern) the device 205 may be able to transmit data (e.g., binary data) to the electronic label 100, as discussed above. For example the computing device 205 may transmit the bit "0" to the electronic label 100 by causing the light source 220 to stop transmitting light 225 the electronic label 100 for a period of time (e.g., half a second, a second, etc.). In some embodiments, the light source 210 and the light source 220 may be combined into a single light source. For example, the single light source may transmit light to both the power generation device 105 and may transmit light to the reflective component 115.

Figure 5:
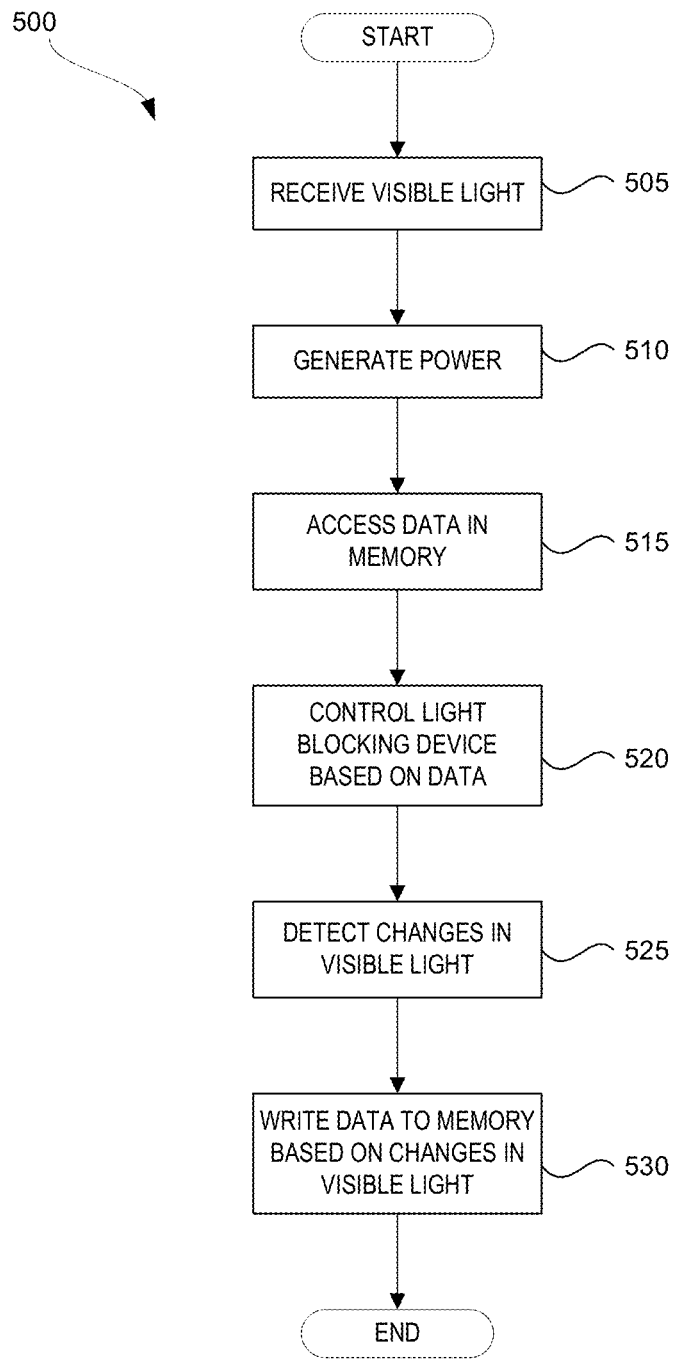
FIG. 5 is a flow diagram illustrating a process for communicating data with an electronic label, according to one or more embodiments of the present disclosure.

FIG. 5 is a flow diagram illustrating a process 500 for communicating data with an electronic label, according to one or more embodiments of the present disclosure. The process 500 may be performed by a processing device (e.g., a processor, a central processing unit (CPU), an ASIC, a FPGA, etc.), an electronic label, and/or parts of an electronic label (e.g., a power generation device, a light blocking device, etc.). The processing device, the electronic label, and/or parts of the electronic label may be processing logic that includes hardware (e.g., circuitry, dedicated logic, programmable logic, microcode, etc.), software (e.g., instructions that run/execute on a processor), firmware, or a combination thereof.

The process 500 begins at block 505 where the process 500 receives visible light from a light source (e.g., ambient light). For example, a power generation device, such as a PV cell, may receive light from the light source. At block 510, the process 500 may generate power using the visible light, as discussed above. For example, the PV cell may generate power using the light source. The power generated by the PV cell may be provided to one or more of a light blocking device (e.g., an LCD, an IMOD, etc.), a processing device, a memory, and one or more sensors, as discussed above.

The process 500 may access data in the memory at block 515, as discussed above. The data may indicate information that should be transmitted (e.g., passively transmitted) to another computing device. For example, the data may include an identifier (e.g., an identification number), maintenance information (e.g., data indicating when maintenance should be performed on a device), etc. As discussed above, some or all of the data may be generated by the one or more sensor devices of the electronic label. For example, the data may indicate temperatures detected by a thermometer (e.g., a sensor device). At block 520, the process 500 controls the operation of the light blocking device based on the data. The process 500 may selectively reflect light (e.g., laser light, UV light, IR light) transmitted by another light source (e.g., a laser) to a reflective component by changing the configuration of the light blocking device based on the data. For example, the process 500 may convey/transmit binary data to another device by changing the configuration of the light blocking device to selectively allow/prevent light from being reflected by the reflecting component, as discussed above.

At block 525, the process 500 may optionally detect changes in the visible light that is received. For example, the power generation device (e.g., the PV cell) may detect changes in the visible light transmitted by the light source (e.g., may detect when the light source transmits visible light and may detect when the light source stops transmitting visible light), as discussed above. The process 530 may write additional data to the memory based on the (detected) changes in the visible light.

Figure 6:
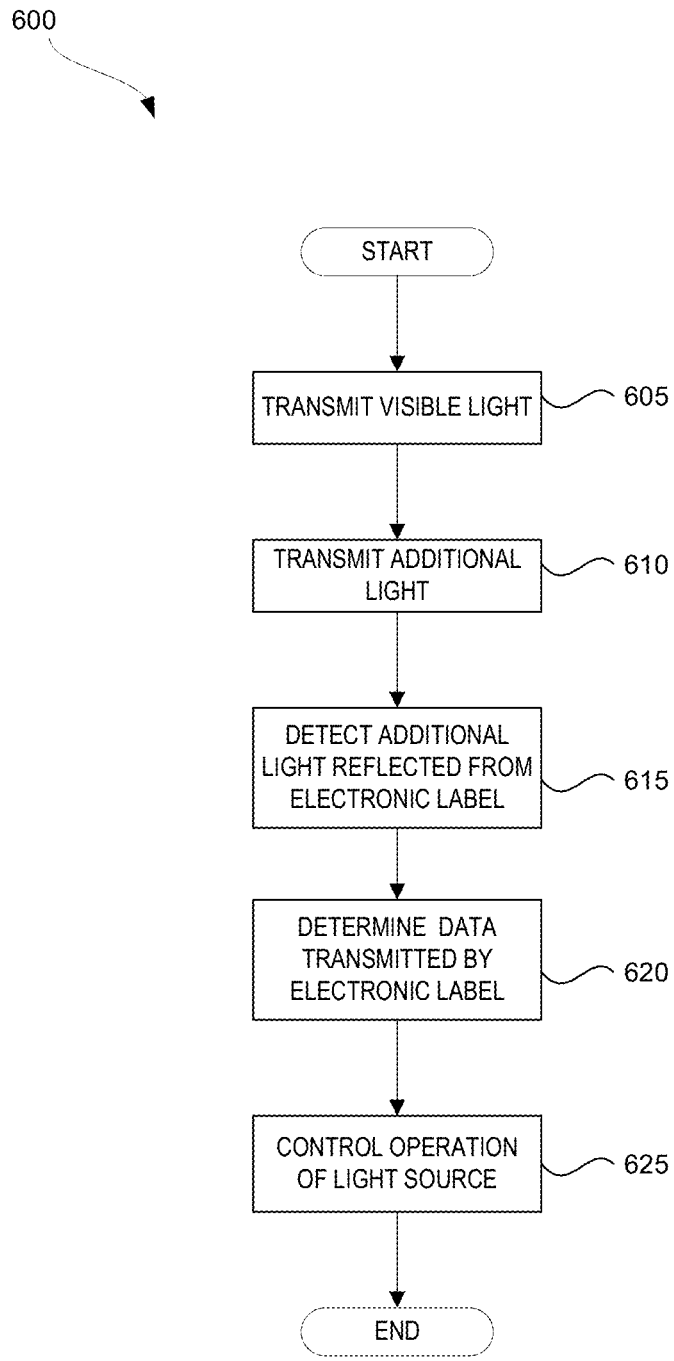
FIG. 6 is a flow diagram illustrating a process for communicating data with an electronic label, according to one or more embodiments of the present disclosure.

FIG. 6 is a flow diagram illustrating a process 600 for communicating data with an electronic label, according to one or more embodiments of the present disclosure. The process 600 may be performed by a processing device (e.g., a processor, a central processing unit (CPU), an ASIC, a FPGA, etc.), a computing/reader device (e.g., device 205 illustrated in FIGS. 4A and 4B). The processing device and/or the computing device may be processing logic that includes hardware (e.g., circuitry, dedicated logic, programmable logic, microcode, etc.), software (e.g., instructions that run/execute on a processor), firmware, or a combination thereof.

The process 600 begins at block 605 where the process 600 transmit visible light to an electronic label. The electronic label may use the visible light to generate power for components of the electronic label, as discussed above. For example, the electronic label may include a PV cell that may generate power for the electronic label using the visible light. The visible light may be transmitted using a first light source (e.g., a flashlight). At block 610, the process 600 may transmit additional light (e.g., second light) to the electronic label. For example, the process 600 may transmit IR light, UV light, laser light, etc., to the electronic label, as discussed above. The additional light may be transmitted to a reflective component and/or a light blocking device of the electronic label. The additional light may be transmitted using a second light source (e.g., a laser).

At block 620, the process 600 detects the additional light that is selectively reflected by the electronic label. For example, the electronic label may change the configuration of a light blocking device to allow and/or prevent the additional light from being reflected, as discussed above. This may cause the additional light to be reflected in a pattern. The process 600 may determine data based on the pattern of the reflected light. For example, the process 600 may decode the pattern to determine/generate binary data based on the selectively reflected light. At block 625, the process 600 may control the operation of the first light source to transmit additional data to the electronic label. For example, the process 600 may turn the first light source on/off in a pattern. The pattern may be used by the electronic label to determine/generate binary data, as discussed above.

General Comments

Those skilled in the art will appreciate that in some embodiments, other types of computing devices and/or memories may be implemented while remaining within the scope of the present disclosure. In addition, the actual steps taken in the processes discussed herein may differ from those described or shown in the figures. Depending on the embodiment, certain of the steps described above may be removed, others may be added, and/or reordered.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. An apparatus, comprising:
    a reflective component configured to reflect light transmitted by a light source;
    a light blocking device configured to:
        in a first configuration, prevent at least a portion of the light transmitted by the light source from reaching the reflective component; and
        in a second configuration, allow the light transmitted by the light source to reach the reflective component;
    memory configured to store data;
    a processing device configured to control operation of the light blocking device based at least partly on the stored data; and
    a power generation device configured to generate power for the light blocking device and the processing device, the power generation device comprising an aperture;
    wherein the power generation device is above the light blocking device such that the aperture exposes at least a portion of the light blocking device; and
    wherein at least the portion of the light blocking device is above the reflective component.

2. The apparatus of claim 1, wherein the processing device is further configured to control the operation of the light blocking device by changing the light blocking device between the first configuration and the second configuration.

3. The apparatus of claim 2, further comprising:
    a sensor device coupled to the memory, wherein the stored data is generated by the sensor device.

4. The apparatus of claim 1, wherein light blocking device comprises a liquid crystal display (LCD).

5. The apparatus of claim 1, wherein light blocking device comprises an interferometric modulator.

6. The apparatus of claim 1, wherein the power generation device comprises a photovoltaic (PV) device.

7. The apparatus of claim 6, wherein the photovoltaic device is configured to generate the power using visible light transmitted by a second light source.

8. The apparatus of claim 7, wherein:
the photovoltaic device is further configured to detect changes in the visible light transmitted by the second light source; and
the processing device is configured to write second data to the memory based on the changes in the visible light.

9. The apparatus of claim 1, wherein the light blocking device is disposed over the reflective component.

10. The apparatus of claim 1, wherein the light comprises one or more of visible light, infrared (IR) light, or ultraviolet (UV) light.

11. The apparatus of claim 1, wherein the apparatus comprises an electronic label.

12. The apparatus of claim 1, wherein the light blocking device is more transparent in the second configuration than in the first configuration.

13. A method, comprising:
accessing data stored in a memory of an electronic label;
controlling operation of a light blocking device of the electronic label, based on the data stored in the memory, to allow a reflective component of the electronic label to selectively reflect light transmitted by a first light source, wherein at least a portion of the light blocking device is above the reflective component; and
generating power, by a power generation device, for the light blocking device, wherein the power generation device is above the light blocking device such that an aperture of the power generation device exposes at least the portion of the light blocking device above the reflective component.

14. An apparatus, comprising:
means for reflecting light transmitted by a light source;
means for blocking the light transmitted by the light source, wherein:
the means for blocking the light prevents at least a portion of the light from reaching the means for reflecting the light when in a first configuration; and
the means for blocking the light allows the light to reach the means for reflecting the light when in a second configuration;
means for storing data;
means for controlling operation of the means for blocking the light based at least partly on the stored data; and
means for generating power for the means for blocking the light and the means for controlling, the means for generating power comprising an aperture;
wherein the means for generating power is above the means for blocking the light such that the aperture exposes at least a portion of the means for blocking the light; and
wherein at least the portion of the means for blocking the light is above the means for reflecting the light.

15. The apparatus of claim 14, further comprising:
means for detecting changes in visible light transmitted by a second light source; and
means for writing second data to the means for storing data based on the detected changes in the visible light.

16. The method of claim 13, further comprising:
receiving visible light from a second light source, wherein the power generation device uses the visible light to generate the power.

17. The method of claim 16, wherein the visible light is received by a photovoltaic (PV) device configured to generate the power using the visible light.

18. The method of claim 13, wherein controlling the operation of the light blocking device comprises:
changing the light blocking device between a first configuration and a second configuration based on the data, wherein:
in the first configuration, the light blocking device prevents at least a portion of the light transmitted by the first light source from reaching the reflective component; and
in the second configuration, the light blocking device allows the light transmitted by the first light source to reach the reflective component.

19. The method of claim 13, further comprising:
detecting changes in visible light transmitted by a second light source; and
writing second data to the memory based on the detected changes in the visible light.

20. The method of claim 13, wherein the data is generated by a sensor device of the electronic label.

21. The method of claim 20, wherein the light comprises one or more of visible light, infrared (IR) light, or ultraviolet (UV) light.

22. The method of claim 13, wherein the light blocking device comprises a liquid crystal display (LCD).

* * * * *